Feb. 2, 1960

R. MILIK 2,923,398

CONVEYORS

Filed May 5, 1955

INVENTOR
RUDOLF MILIK
BY
Wenderoth, Lind & Ponack
ATTORNEYS

Feb. 2, 1960   R. MILIK   2,923,398
CONVEYORS

Filed May 5, 1955   9 Sheets-Sheet 2

INVENTOR
RUDOLF MILIK
BY
Wenderoth, Lind & Ponack
ATTORNEYS

Feb. 2, 1960

R. MILIK 2,923,398

CONVEYORS

Filed May 5, 1955

INVENTOR
RUDOLF MILIK

BY

ATTORNEYS

United States Patent Office 2,923,398
Patented Feb. 2, 1960

2,923,398

CONVEYORS

Rudolf Milik, Holloway, London, England

Application May 5, 1955, Serial No. 506,228

Claims priority, application Great Britain May 5, 1954

6 Claims. (Cl. 198—92)

This invention relates to conveyers, particularly endless belt conveyers and similar conveyers, as employed for transporting materials, for instance, coal and goaf filling material in coal mines.

The main object of the present invention is to provide an improved sectional conveyor of the kind comprising a plurality of units each provided with a separate endless conveyor of belt or similar form. The term "sectional conveyor" is employed herein to cover a conveyor system comprising a main conveyor such as set up in a main mine road and extended into branch roads by means of one or more extensions, or the associated sections of a main conveyor or of an extension.

Another object of the present invention is to provide an improved sectional conveyor of the kind referred to, which is characterized in that each two adjacent units are interconnected end to end by a jib to which at least one of said two units is articulatingly connected by means of a hollow pivot.

The improved sectional conveyor thus comprises a series of units, each unit consisting of a conveyor section and an associated jib, with a power receiving device at one end of the unit and a complementary power-transmitting device at the other end of the unit.

Moreover, the coupling means between the conveyor units are standardized, so that the units are interchangeable and may be coupled together in any desired order.

Since the one or more units of a conveyor are interchangeable, that is, the receiving end of any unit is complementary to and adapted to cooperate with the transmitting end of any other unit, provision is made of power-transmitting units for drivingly coupling one unit to another.

The coupling together of conveyor units and the transmission of power therebetween may be effected through the same mechanism. The preferred method is to employ a jib with a hollow pivot so that the jib is connectable at one end with one element of a power transmission gear train at the transmitting end of a unit such as referred to above, and connectable at the other end with another element of said gear train; for instance, a hollow jib may house an endless chain connected to sprocket wheels at opposite ends of the jib, one sprocket wheel receiving driving power and the other sprocket wheel transmitting driving power.

Although the coupling and power-transmission means are preferably of similar or equivalent form so as to be interchangeable the conveying surfaces may be varied, if necessary, to suit various circumstances.

In a conveyor system for transporting coal or other mineral from the working face of a mine, the leading end of one unit is arranged on a slightly higher level, than, and overhanging the tail end of an adjacent unit, so that coal or other mineral loaded on to the outermost or endmost unit is progressively dumped from one unit to another and finally on to the main conveyor.

The coupling between adjacent units is preferably effected through an overload safety device. The form of coupling and power transmission means employed should be such that the various units of the conveyor extension can adjust themselves to any unevenness in the mine road and can maintain effective coupling and power transmission when the units are axially disaligned.

The transmission of power between adjacent units is effected through positive or direct drive mechanisms, which incidentally impart rotatory motion to the conveyor belts. These positive or direct drive mechanisms in the sections may be chain drives, or preferably, toothed gear and shaft drives.

Some practical embodiments of the invention are illustrated, by way of example, in the accompanying drawings wherein.

Figure 1:
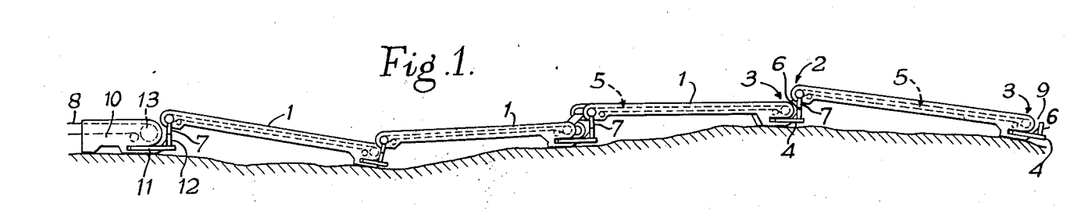
Figures 1 and 2 are an elevation and plan respectively of a sectional conveyor installation arranged at the tail end of a main conveyor.
Figure 2:
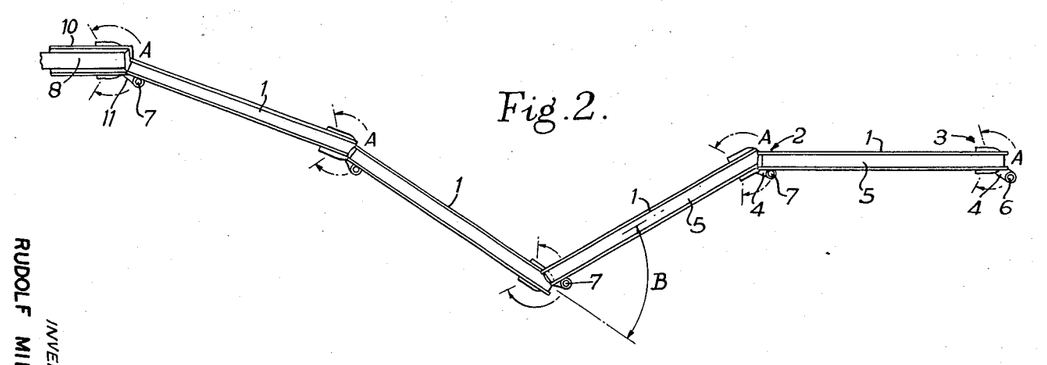

The sectional conveyor installation illustrated in Figures 1 and 2 comprises a number (four are shown) of conveyor units 1 identical so far as coupling means are concerned, and each having a power-receiving end 2 constructed for interchangeable coupling with a power transmitting end 3 of any other unit; that is, the power-receiving end 2 of each unit 1 is constructed complementary, so far at least as coupling is concerned, with the power-receiving end 3 of the same unit.

Each conveyor unit 1 comprises a jib 4 at the power transmitting end 3, arranged parallel to the upper and lower runs of an endless conveyor belt 5 and adapted for swinging about its inner end through a wide angle, as indicated by angle A. At the outer end of the jib 4 is an upstanding post 6 for equivalent member complementary in form, so far as coupling is concerned, with a depending socket 7 or the like at the power receiving end 2 of the unit 1, and since the coupling means of all units are identical the units can be arranged interchangeably in any order.

It will generally be convenient for all units 1 to be of the same construction and size, but if preferred some units may be longer than others; the only material difference between the units is then the length of the belt 5 and any necessary supporting means.

The socket 7 is mounted in pendulum manner so that irrespective of the slight normal inclination of the unit 1, even when on a level road (see Figure 3), the coupling is maintained with the post 6. This pendulum mounting of socket 7 also maintains the coupling with post 6 when the various interconnected units 1 are placed on an uneven road, as indicated in Figure 1. The normal inclination of any one unit 1 (as indicated in Figure 1) brings its power-receiving end 2 above the level of and slightly overhanging the power-transmitting end 3 of the adjacent preceding unit and the first unit of the conveyor is also brought above the level of the upper run of a main conveyor 8. It is assumed that the installations illustrated in Figures 1 to 5 would be used for delivering coal, which is loaded at the tail end 9 of the sectional conveyor and discharged on to the main conveyor 8.

In Figures 1 and 2 the sectional conveyor extension is shown attached to the tail end of the main conveyor 8 and to facilitate this attachment a tail-end drive unit 10 is provided. This drive unit 10 has a coupling jib 11 and post 12 (equivalent to jib 4 and post 6 respectively) so that through the post 11 the drive unit 10 can be readily coupled to the conveyor extension. In this tail-end drive unit 10 the main conveyor belt 8 is looped around a terminal drum 13 which is rotated by the belt 8, which is power-driven in any suitable and known manner.

Figure 3:
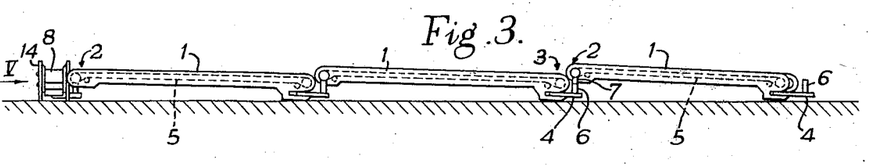
Figures 3 and 4 are similar views showing a sectional conveyor installation branching laterally from a main conveyor.
Figures 4, 5:
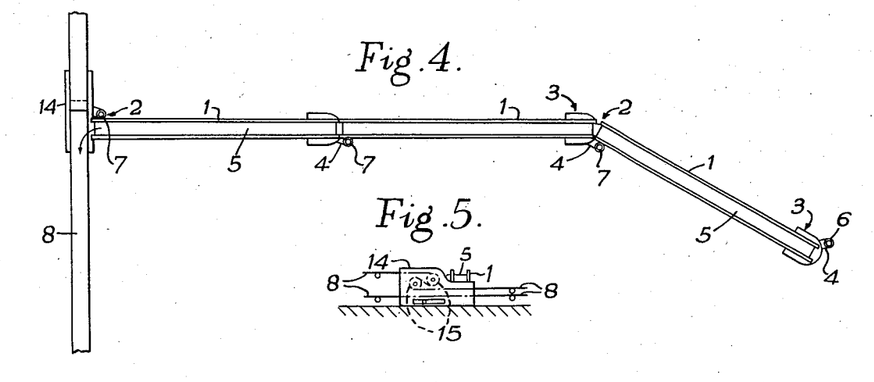
Figure 5 is a detail view looking in the direction of arrow V, in Fig. 3.

In the unit 14 illustrated in Figures 3, 4 and 5 for attaching a lateral extension to the main conveyor, the upper run of the main conveyor belt 8 is passed around drums 15 which has the effect of forming a drop or step on the receding part of said run, the first unit 1 of the conveyor extension being arranged to discharge onto the low lever part of the upper run of belt 8; the drums 15 are both rotated through the power-driven belt 8. The unit 14 also has a jib 11 and post 12 to facilitate attachment of the lateral conveyor extension.

In both the tail end drive unit 10 and the lateral attachment unit 14 power is available at the drum 13 and/or at either of the drums and this power is transmitted in any suitable manner to the conveyor extension, the power available in the main conveyor being thus transmitted from one unit to another. It is convenient, as already mentioned, to construct the interchangeable coupling means associated with the main conveyor drive and attachment units 10 and 14 respectively and those for the extension units 1 to function as power-transmitting and receiving means.

Figures 6, 7:
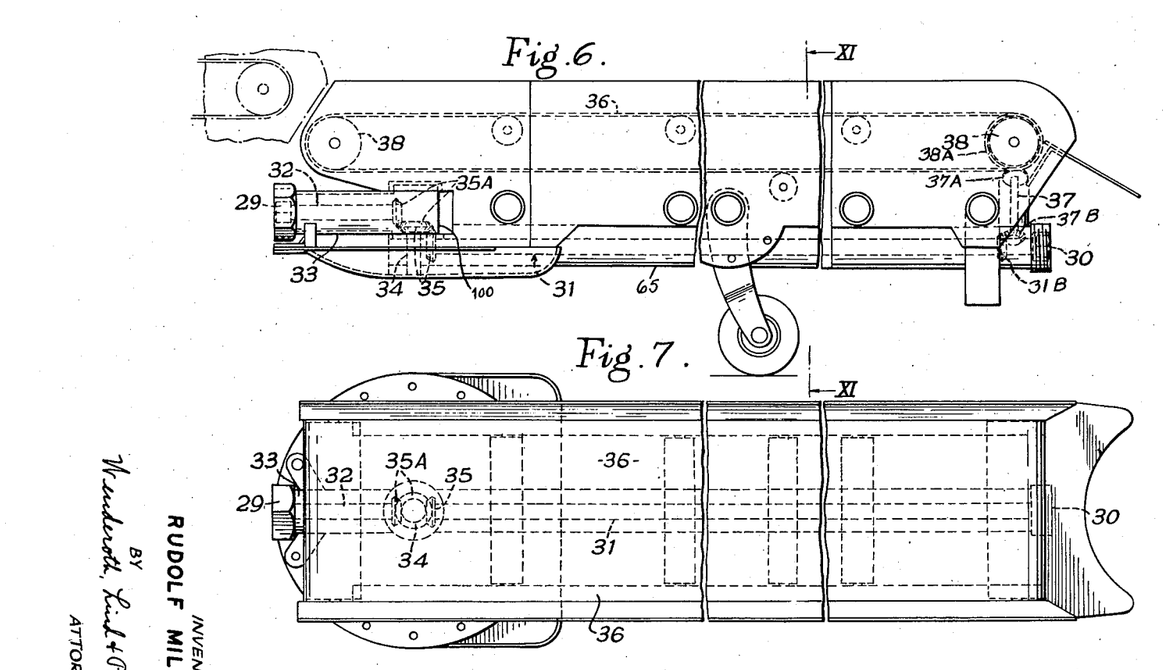
Figures 6, 7 and 8 are a side elevation, a plan and a part sectional end view respectively of a conveyor unit having a toothed gear and shaft direct drive mechanism.
Figures 8, 11, 16:
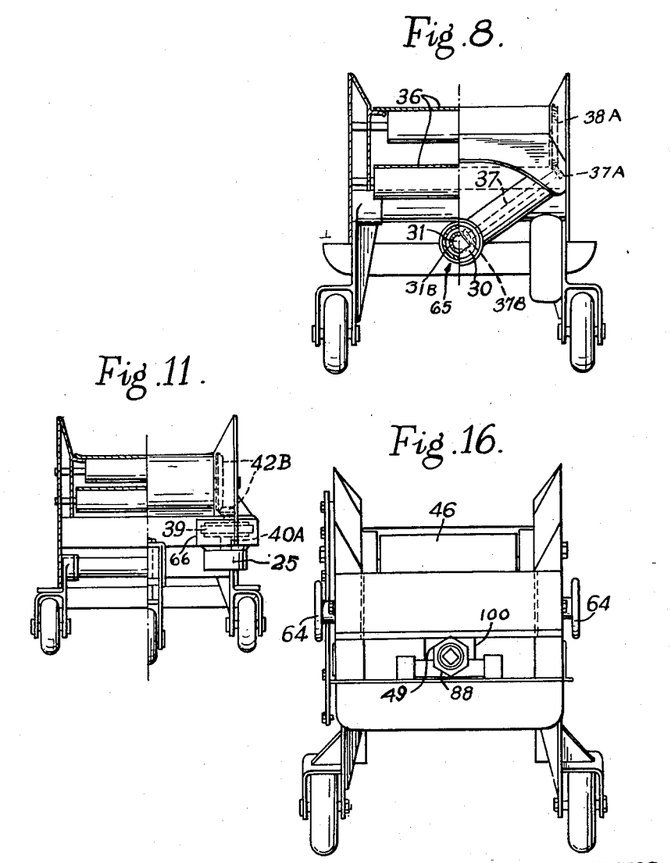
Figures 9, 10 and 11 are similar views of a conveyor unit utilizing a direct chain drive.
Figures 14, 15 and 16 are a side view, plan and end view respectively of a further form of conveyor unit.

In the conveyor unit shown in Figures 6, 7 and 8, spigot and socket members 29, 30 respectively, are of complementary form, so that the units are interchangeable, and are arranged to open in opposite longitudinal directions. The socket member 30 houses the end of a longitudinally and centrally supported main shaft 31 which is journalled in a tubular casing 65. The spigot member 29 houses the end of a longitudinal layshaft 32 journalled for rotation in a hollow jib 33, adapted to swing on a hollow pivot 100 about a vertical shaft 34, both the main shaft 31 and the layshaft 32 being connected to the vertical shaft 34 by means of bevel gearing 35, 35A respectively. The end 32A of jib shaft 32 is squared to fit a complementary socket 31A on the end of shaft 31. The conveyor belt 36 is driven from the main shaft 31 through a lateral shaft 37 by means of bevel pinions 37A, 37B which cooperates respectively with a bevel wheel 38A on one of the end supporting drums 38 of said belt 36 and with a bevel pinion 31B on shaft 31.

Figure 9:
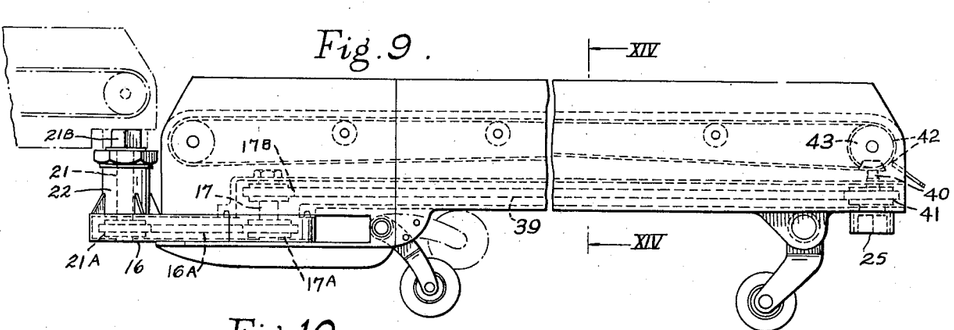
Figure 10:
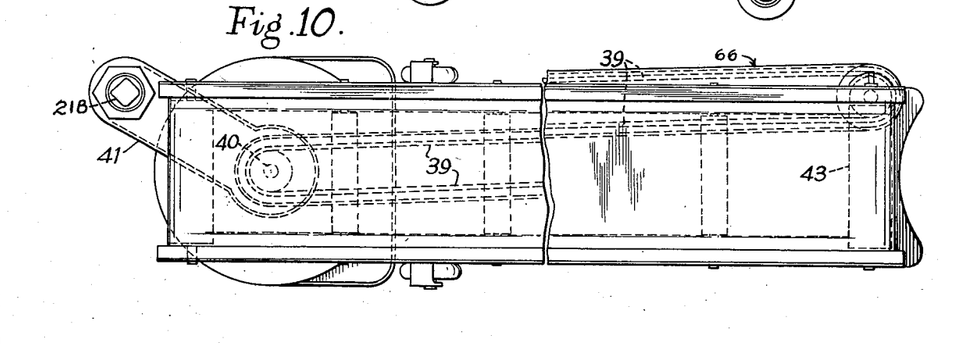

The embodiment shown in Figures 9, 10 and 11 differs from that described in connection with Figures 6, 7 and 8 in that a drive chain 39 extends within housing 66 from the vertical shaft 17 of jib 16 to a laterally offset socket member 25, the shaft 40 of the chain sprocket wheel 41 at this end being upwardly extended to drive through bevel gearing 42 the belt drum 43. The drive chain 39 drives shaft 17 through spur gearing 17B and shaft 17 in turn drives shaft 21 through gear 17A, chain 16A and gear 21A.

Figure 12:
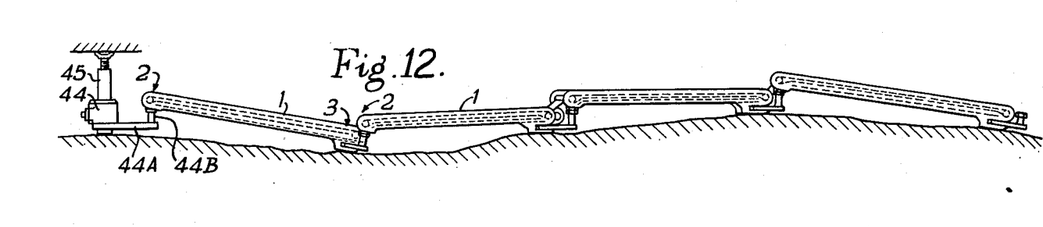
Figures 12 and 13 illustrate a modification of the installation shown in Figures 1 and 2.
Figure 13:
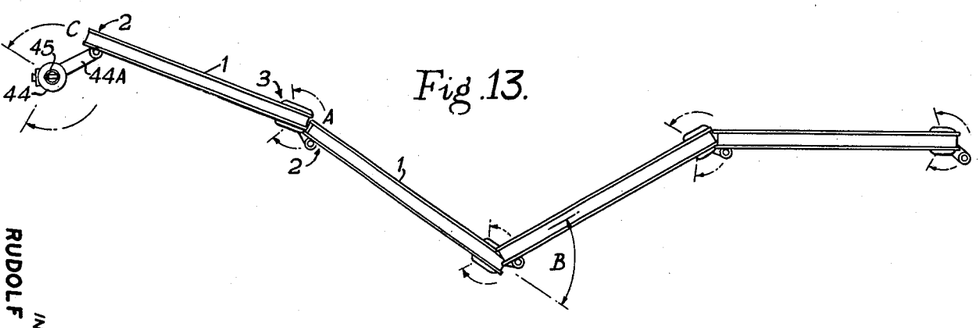

Figures 12 and 13 show an installation adaptable for use with any of the conveyors previously described and differs from the installation shown in Figures 1 and 2 in that the power unit 44 is a separate unit adapted to rest on the mine floor or be mounted, as shown, on a post 45, secured in the manner of a pit prop, instead of being part of the leading section of the conveyor.

Figure 14:
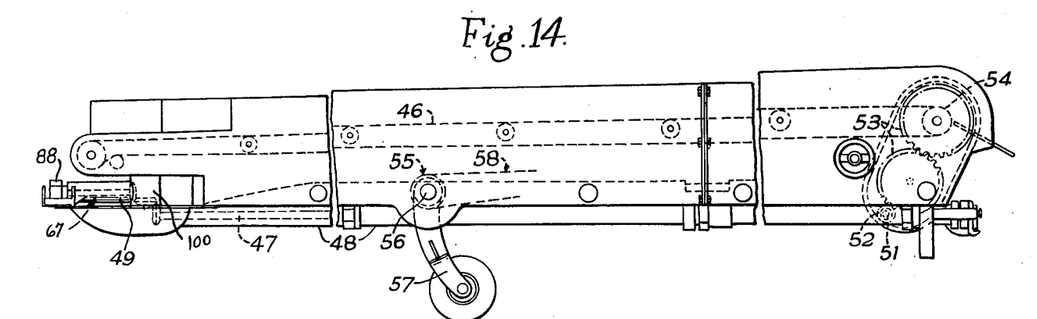
Figure 15:
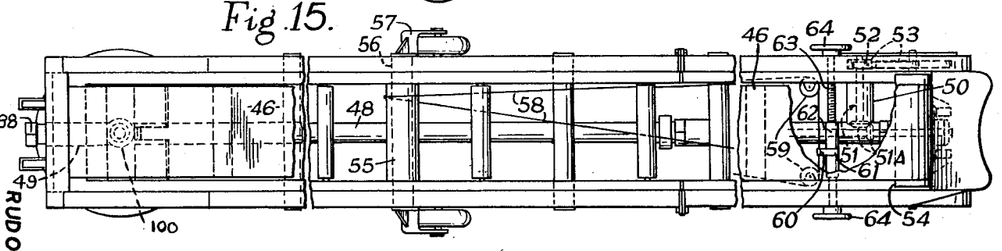

Figures 14, 15 and 16 illustrate another construction of conveyor unit in which a further mode of driving a conveyor belt 46 is employed. The drive means again consists of a main drive shaft 47, enclosed in a tubular housing 48 and deriving motion, as already described, through a swingable jib 49. A branch 50 of the housing 47 accommodates a transverse layshaft 51, deriving rotary motion from shaft 47 in any suitable manner, such as by bevel gearing 51A, and in turn driving a pinion 52 in mesh with a pair of spur wheels 53, the second of which imparts rotation to a belt-supporting roller 54.

This construction of conveyor unit also illustrates an elevating device (applicable generally to all other constructions) and consisting of a drum 55 on the axle 56 of a swingable two-wheel bogey 57. An endless cable 58 is looped around drum 55 and around transversely aligned sheaves 59. The cable 58 is anchored at 60 to drum 55 and also to arm 61 projecting from an internally threaded sleeve 62 which engages and is carried by a screwed spindle 63 rotatable from either end by handwheels 64. As either handwheel 64 is turned the sleeve 42 traverses the spindle 63 and through arm 61 effects displacement of cable 58, which by reason of being anchored at 60 to drum 55 rotates the latter and causes a swinging of the bogey 57 in the required direction.

Figure 17:
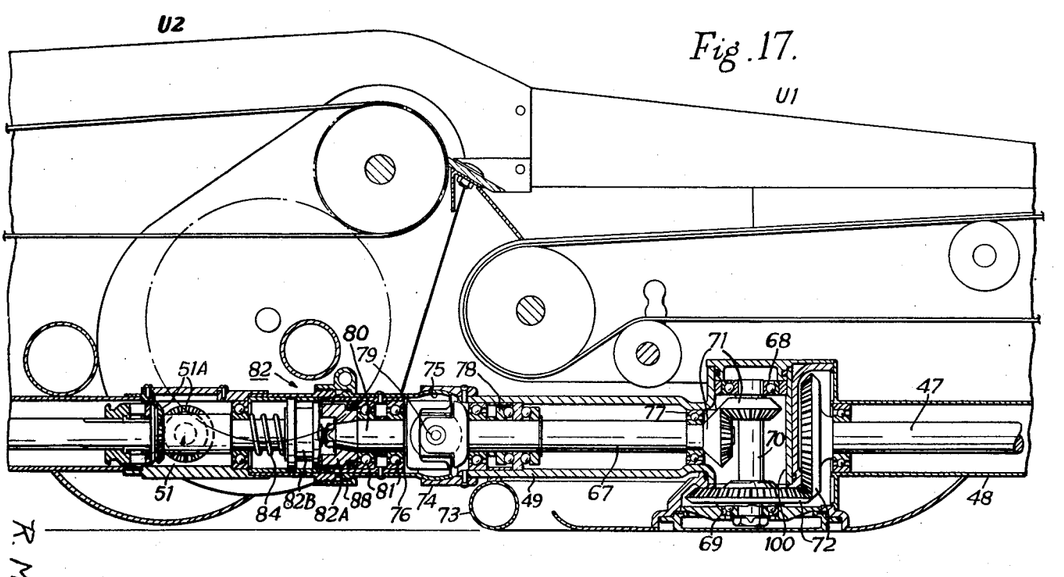
Figures 17 and 18 are a sectional elevation and a fragmentary sectional plan respectively of power coupling and transmission mechanism suitable for a conveyor unit of the construction shown in Figures 14, 15 and 16.
Figure 18:
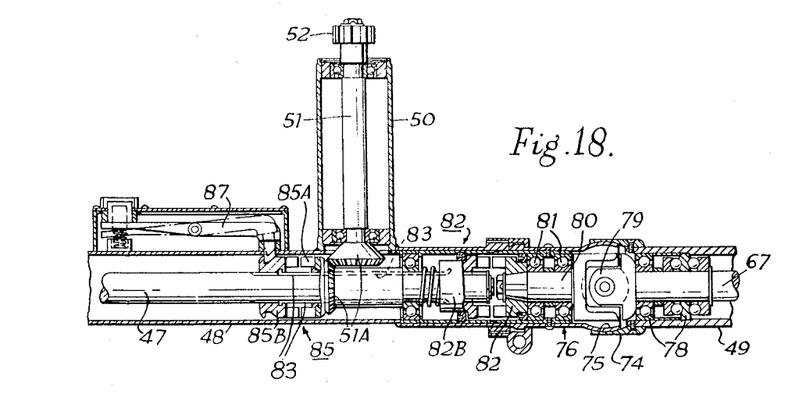

Figures 17 and 18 illustrate power coupling and transmission mechanism suitable for a conveyor unit of the construction shown in Figures 14, 15 and 16. The basic components of the mechanism are the same as those illustrated in Figures 14, 15 and 16, but they are shown slightly rearranged to dispose the main drive shaft 47 in its housing 48 in axial alignment with the auxiliary drive shaft 67 in the jib 49, instead of these shafts 47 and 67 being disaligned axially as illustrated in Figure 14.

The jib 49 is formed integral with the hollow pivot 100 within which is journalled in bearings 68, 69 a pivot shaft 70 drivingly connected with the auxiliary shaft 67 through bevel gearing 71 and with the main shaft 47 through bevel gearing 72. The swingable jib 49 is supported near its outer end by an arcuate tube 73.

The outer end of the tubular jib 49 carries a spherical socket 74 which engage in swivel-manner with the complementary spherical end 75 of a tubular sheath 76, and the auxiliary shaft 67 journalled in bearings 77, 78 in the tubular jib 49 is swivelly connected by a universal joint 79 to a stub shaft 80 supported by a bearing 81 in the sheath 76. On the extremity of stub shaft 80 one part 82A of a dog clutch 82 is secured.

The above described parts are carried by one conveyor unit, marked U1, and the complementary or mating part of the dog clutch 82 is provided on the righthand end of main shaft 47 in unit U1; the clutches 82 of adjacent units are interchangeable and accordingly a complementary or mating part 82B carried on the adjacent unit U2 is shown as in engagement with part 82A of unit U1; it is through such a clutch 82 that power is transmitted from one unit to another and through each unit by means of the auxiliary or jib shaft 67 with its stub shaft 80 (via universal joint 79) and main shaft 47 through the shaft 70 passing through hollow pivot 100 (via bevel gearings 71, 72).

The clutch part 82B is secured to the associated main shaft 47 by keys 83 (see Figure 18) which permit of axial sliding along the shaft against the opposition of spring 84. The dogs on the clutch parts 82A, 82B are so formed that in the event of excessive loading being imposed on the belt drive means the clutch 82 acts as an overload release.

One of the bevel gears 51A provided for driving the conveyor belt 46 through the transverse layshaft 51 is associated with one part 85A of another dog clutch 85, the part 85A with the corresponding bevel gear 51A being loose on the shaft 47. The other part 85B of the clutch is slidably connected by the same keys 83 to shaft 47 so that the parts 82B and 85B are interconnected and slide together. The interconnected clutch parts 85A, 85B are adapted to be held in the uncoupled position by a manually operable pivoted latch 87 engageable with part 85B (as shown in Figure 18). When the latch 87 is operated to release the clutch parts 82B, 85B they are urged to the engaged position by spring 84.

A nut 88 is slidable over but held captive on sheath 76 and is engageable with a male thread on the end of housing 48 to couple adjacent units together.

I claim:

1. A conveyor unit adapted for serial connection with similar units to constitute an extended conveying apparatus, said unit comprising a transportable conveyor frame and a jib pivotally anchored beneath one end of said frame by a hollow pivot disposed substantially equidistant from said jib end and from the sides thereof, main power conveying means extending lengthwise of said frame from the pivotal anchorage of its jib, a connecting shaft extending through said hollow pivot, auxiliary power conveying means carried by said jib and drivingly engaged with said main power conveying means through said connecting shaft, complementary power transmitting and receiving devices carried at opposite ends of said frame and connected one with said main power conveying means and the other with said auxiliary power conveying means, an endless conveyor surface mounted on said frame above said power conveying means for movement lengthwise of said frame and drive means drivingly connecting said conveyor surface to said main power conveying means.

2. A conveyor unit adapted for serial connection with similar units to constitute an extended conveying apparatus, said unit comprising a transportable conveyor frame rockable upon a pair of transversely aligned wheels, and a jib swivel mounted beneath one end of said frame by a hollow pivot, located on the longitudinal central axis of said frame, a main power conveying shaft extending lengthwise of said frame from said hollow anchorage pivot to the other end of said frame, an auxiliary power conveying shaft carried by said jib gearing connecting said main and auxiliary power conveying shafts and including a connecting shaft extending through said hollow pivot, a power transmitting device carried at the end of said frame other than that beneath which said jib is swivel mounted, and drivingly connected to said main power conveying shaft, a complementary power receiving device on the outer end of the jib and drivingly connected with said auxiliary power conveying shaft, an endless conveyor surface mounted above said main power conveying shaft for movement lengthwise of said frame and gearing traversing said conveyor surface from said main power conveying shaft.

3. A sectional conveyor consisting of interconnected transportable units, each unit comprising in combination, a channel-like wheeled framework; a plurality of transverse rollers within and extending throughout the length of said framework, and including a drive roller; an endless conveyor belt embracing said rollers; a tubular housing extending longitudinally of said framework beneath said belt; a tubular jib disposed with its inner end beneath said framework and its outer end extending beyond an end of said framework; a hollow pivot sleeve to pivotally connect said jib to said tubular housing; a vertical shaft journalled within said pivot sleeve and rotatable about the axis of pivoting of said jib; a first power coupling on the outer end of said jib drivingly connected with said vertical shaft, a second power coupling complementary to said first coupling and mounted at the opposite end of said tubular housing, main mechanical drive means extending within said tubular housing between said vertical shaft and said second coupling, and auxiliary mechanical drive means for transmitting rotary motion from said main drive means to said belt drive roller.

4. A sectional conveyor consisting of interchangeable interconnected transportable units, each unit comprising in combination, a channel-like wheeled framework; a flat conveying section within and extending longitudinally of said framework; a tubular jib disposed with its inner end beneath said framework and its outer end extending beyond an end of said framework; a hollow pivot sleeve to pivotally connect said jib to the adjacent end of said framework; a vertical shaft journalled within said pivot sleeve and rotatable about the axis of pivoting of said jib; a first power coupling on the outer end of said jib means interconnecting said first power coupling and said vertical shaft for driving said vertical shaft; a second power coupling complementary to said first coupling and mounted at the opposite end of the framework, and main mechanical drive means extending beneath said conveying section between said vertical shaft and said second coupling.

5. A sectional conveyor consisting of interchangeable interconnected transportable units, each unit comprising in combination, a channel-like wheeled framework; a plurality of transverse rollers within and extending through the length of said framework, and including a drive roller; an endless conveyor belt embracing said rollers; a tubular housing extending longitudinally of said framework beneath said belt; a tubular jib disposed with its inner end beneath said framework and its outer end extending beyond an end of said framework; a horizontal rotatable main shaft extending through said housing; a hollow pivot sleeve to pivotally connect said jib to said tubular housing; a vertical shaft journalled for rotation within said pivot sleeve about the axis of pivoting of said jib and drivingly connected to said horizontal main shaft; a horizontal rotatable stub shaft extending through said jib; a first power coupling on the outer end of said jib drivingly connected with said vertical shaft through said stub shaft; a second power coupling drivingly connected to said main shaft and complementary to said first coupling and mounted at the opposite end of said tubular housing; and auxiliary mechanical drive means transmitting rotary motion from said main shaft to said belt drive roller.

6. A transportable conveyor unit for interchangeable driving interconnection with similar units, said unit comprising in combination, a channel-like wheeled framework; a plurality of transverse rollers within and extending throughout the length of said framework, and including a drive roller; an endless conveyor belt embracing said rollers; a tubular housing extending longitudinally of said framework beneath said belt; a tubular jib disposed with its inner end beneath said framework and its outer end extending beyond an end of said framework; a hollow pivot sleeve to pivotally connect said jib to said tubular housing; a vertical shaft journalled within said pivot sleeve and rotatable about the axis of pivoting of said jib; a first power coupling on the outer end of said jib drivingly connected with said vertical shaft; a second power coupling complementary to said first coupling and mounted at the opposite end of said tubular housing, main mechanical drive means extending within said tubular housing between said vertical shaft and said second coupling, and auxiliary mechanical drive means for transmitting rotary motion from said main drive means to said belt drive roller.

References Cited in the file of this patent

UNITED STATES PATENTS

| 1,278,426 | Bernheim | Sept. 10, 1918 |
|---|---|---|
| 1,338,727 | Gretencord | May 4, 1920 |
| 1,446,124 | Lichtenberg | Feb. 10, 1923 |
| 1,476,634 | Neighbour | Dec. 4, 1923 |
| 1,810,119 | Bebinger | June 16, 1931 |
| 2,674,364 | Cartlidge | Apr. 6, 1954 |
| 2,722,409 | Bergmann | Nov. 1, 1955 |